May 3, 1938.   J. G. JACKSON   2,116,488
CENTERING PAN SET
Filed Jan. 13, 1937

Inventor
Joseph G. Jackson
By Stanley Hoods
Attorney

Patented May 3, 1938

2,116,488

UNITED STATES PATENT OFFICE 2,116,488

CENTERING PAN SET

Joseph G. Jackson, Oak Park, Ill., assignor to The Edward Katzinger Company, Chicago, Ill., a corporation of Illinois Application January 13, 1937, Serial No. 120,398

7 Claims. (Cl. 53—6)

This invention relates to multiple unit baking pan sets wherein a series of individual baking pans are secured together in spaced parallel relation by straps combining to form a frame surrounding and securing said pans, and has for its object the incorporation of elements in the structure of the straps whereby such pan sets, when nested and stacked, will be so centered that relative movement between the several sets is overcome, the tilting or tipping of the stack of pan sets is eliminated, and the walls of other pans of each set in a stack will be spaced from the walls of the lowermost pan set.

Figure 1:
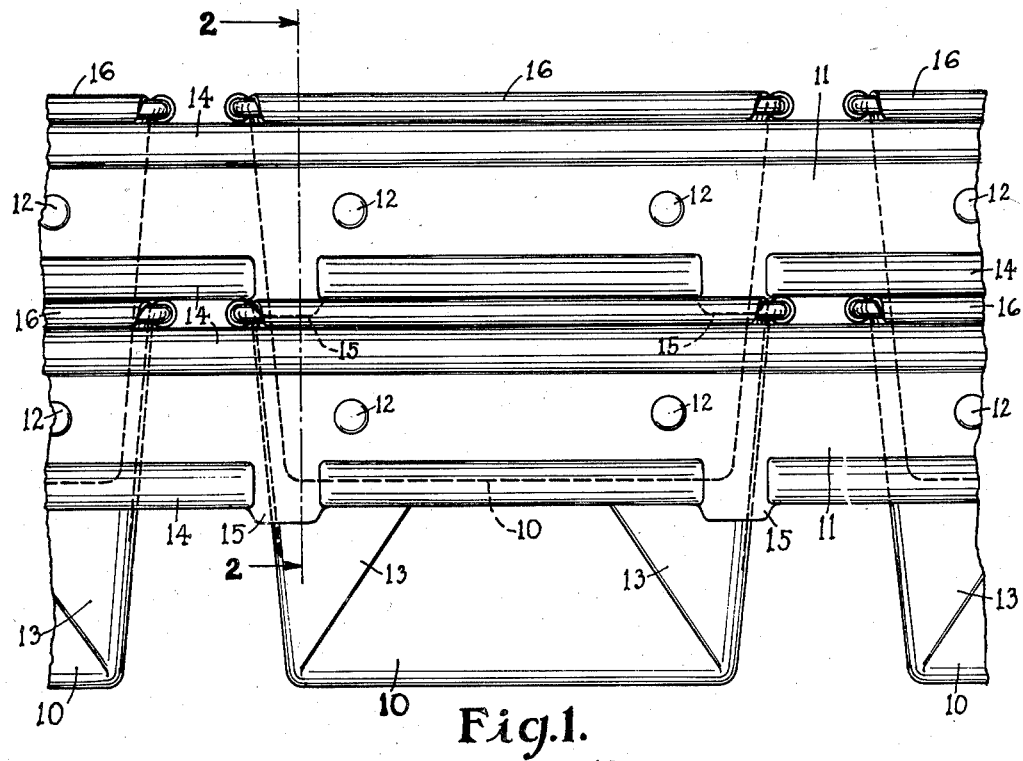
Figure 2:
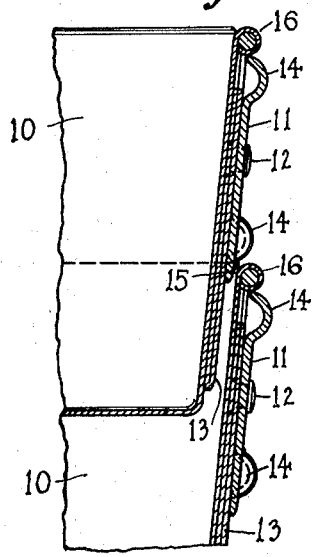

With the above and other objects in view, as will be apparent, this invention consists in the construction, combination and arrangement of parts, all as hereinafter more fully described, claimed and illustrated in the accompanying drawing, wherein:

Fig. 1 is a fragmentary elevation of two nested or stacked pan sets constructed in accordance with the present invention; and Fig. 2 is a fragmentary vertical section taken along line 2—2 of Fig. 1.

Heretofore, baking pan sets, consisting of a plurality of spaced, parallel individual baking pans, have been created by surrounding the outer walls of the several pans of the set with a frame of any suitable structure, which is attached in any desired manner to the exposed walls of the pans. These pans are usually flared slightly to permit the clearance of the material baked therein so that the pans of one set may be inserted or nested in the pans of another set thereby creating a stack of pan sets when not in use. The straps which form the frame whereby the pans of each set are secured one to the other, in spaced parallel relationship, are usually relatively wide, and at their lower edges contact with and rest upon the upper edges of the walls of the pans of the lowermost pan set when such sets are nested thereby creating a nesting line. When the pans are so nested due to the flare of the pans, there are spaces between the walls of the pans of the several nested sets, resulting in a possible relative movement between the sets both longitudinally and transversely of the sets and frequently causes a rubbing between the walls of the nested sets that results in black or discolored spots on the inner faces of the pan walls which are frequently transferred to the baked goods.

The present invention contemplates a means on the strap or straps whereby this relative movement is eliminated and the walls of the individual pans of nested sets are maintained separated or spaced to prevent any rubbing of the surfaces of the pan walls one against the other.

Reference being had more particularly to the drawing, 10 designates a plurality of individual baking pans which are combined to form a multiple unit pan set. Straps 11 are positioned against the end walls of these pans 10 and are secured thereto in any suitable manner, such as the rivets 12 which pierce the center of the straps and the corner laps 13 on the end walls of the pans 10. It is obvious that the construction of the pans 10 and of the straps 11 and the means by which the latter are secured to said pans form no part of the present invention. The construction thereof may be varied and changed at will without departing from the spirit and scope of this invention, which is readily applicable to all types of straps. The straps shown herein consist of a flat metal strap 11 adapted to rest flush against the end walls of the pans 10 and provided with outwardly curved, projecting beads 14 along its longitudinal edges. It will be noted from Fig. 2 that the longitudinal beads 14 of the strap 11 are substantially semi-circular in cross-section and terminate under and against the outwardly projecting beads 16 at the edges of the end walls of the pans 10.

In order to provide for the nesting of the pans whereby the individual sets will not have any appreciable movement relative one to the other, the lower edge of the strap 11 is provided with a pair of downwardly extending ears 15 which are formed from the bead 14 below the lower longitudinal edge of the strap. These ears 15 are formed in pairs and one is provided adjacent each outer corner of one or more pans 10 of the set. There may be a pair of ears 15 projecting from the lower edges of the opposed longitudinal side straps of the set for each pan in the set, or there may be a pair of ears 15 for only a portion of the pans of the set. Being so situated, when the sets are nested, the pairs of ears 15 of the uppermost pan set will enter into the corners of the corresponding pans of the lowermost pan set and will contact with the inner surfaces of the extreme upper edges of the walls of the pans 10 of the lowermost pan set adjacent the beads 16, at the edges thereof.

The ears 15 of the straps 11 of the uppermost pan set only enter the pans 10 of the lowermost pan set a relatively short distance, i. e. sufficiently to have a substantial contact with the inner surfaces of the walls of the lowermost pans 10 adjoining the edges, and therefore, do not have any contact with those portions of the pan walls that eventually bear against the loaves or other materials baked in the pans of the set.

When pan sets such as are illustrated in the drawing are nested one into the other, the lower edges of the straps 11 of the upper sets rest on beads 16 of the pans 10 of the lower set and at least one pair of ears 15 on the opposed longitudinal side straps 11 of the set enters one of the lower pans 10 at the corners thereof. If there is a tendency of the sets to move longitudinally relatively to each other, the ends of the ears 15 instantly contact the inner faces of the side walls of the pans 10 adjacent the corners of the pans and prevent such movement: and if there is a tendency of the sets to move transversely relatively to each other, the sides of the ears 15 immediately contact the inner faces of the end walls of the pans 10.

Manifestly, the pairs of ears 15 on the straps 11 of the sets, may be arranged in any suitable manner and may be of any number. For instance, a pair of ears 15 may be provided for each end of each pan 10 and be aligned transversely of the set; or the pairs may be staggered by providing a pair of ears 15 for one end of one pan 10 and a pair for the opposite end of the next adjacent pan; or there may be a pair of ears 15 at each end of only one pan 10 of the set; or there may only be one pair of ears 15 on each longitudinal side strap 11 of the set and these pairs of ears 15 need not necessarily be aligned transversely of the set. In other words, the positions of the pairs of ears 15 on the straps 11 and the number of such pairs may be varied without departing from the spirit and scope of the present invention so long as there is at least one pair of ears on each longitudinal side strap 11 of the set positioned to enter the adjoining corners of a lower pan 10 of a lower pan set.

What is claimed is:

1. A pan set consisting of a plurality of spaced baking pans and a strap coacting with the end walls of said pans to secure them one to the other in a spaced parallel relation, and a pair of ears formed on said strap adapted to enter a pan of a lower set upon the nesting of two or more sets.

2. A pan set consisting of a plurality of spaced parallel baking pans and straps coacting with the end walls of said pans to secure them one to the other in a set and pairs of ears coplanar with said straps and projecting downwardly from the lower edges thereof to enter pans of a lower set when two or more sets are nested.

3. A pan set consisting of a plurality of spaced parallel baking pans and straps coacting with the end walls of said pans to secure them one to the other in a set, and pairs of ears coplanar with said straps and projecting downwardly from the lower edges thereof to enter pans of a lower set when two or more sets are nested, one of said ears cooperating with one of the adjacent corners of said lower set.

4. The combination with a baking pan, of straps coacting with the end walls thereof, and ears on each of said straps adjoining corners of the pan and positioned to enter the corners of a subjacent pan when several pans are nested.

5. The combination with a baking pan, of a strap coacting with an end wall thereof, of a pair of ears coplanar with the strap and projecting below the lower edge thereof to enter a subjacent pan upon the nesting of several such pans.

6. The combination with a baking pan, of a strap coacting with an end wall thereof, of a pair of ears coplanar with the strap and projecting below the lower edge thereof, one ear being positioned adjacent each pan corner and adapted to enter the corresponding corner of a subjacent pan when several pans are nested one within the other.

7. In a pan set, consisting of a plurality of baking pans secured one to the other in a set by straps coacting with the end walls of said pans, the combination with a pair of ears on each strap projecting below the lower edge thereof and so positioned adjoining the corners of a pan of the set that they will enter the corresponding corners of a pan of a subjacent set when two or more pan sets are nested one into the other.

JOSEPH G. JACKSON.